Figure 1:
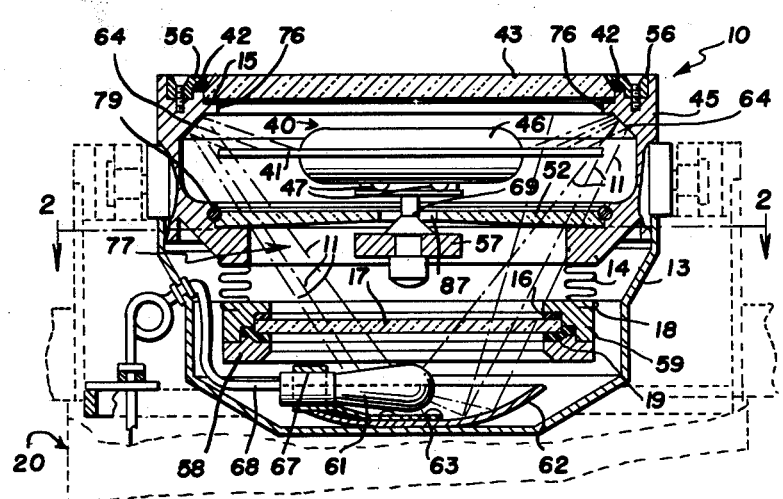

March 13, 1956  N. S. SPENCER ET AL  2,738,412
COMPASS ILLUMINATING ASSEMBLY
Filed Nov. 7, 1952

INVENTORS
NYE S. SPENCER
ALVIN G. McNISH
HUGH F. GINGERICH
BY
ATTORNEYS

United States Patent Office 2,738,412
Patented Mar. 13, 1956

2,738,412

COMPASS ILLUMINATING ASSEMBLY

Nye S. Spencer, Merion Station, Pa., Alvin G. McNish, Chevy Chase, Md., and Hugh F. Gingerich, Washington, D. C., assignors to the United States of America as represented by the Secretary of the Navy Application November 7, 1952, Serial No. 319,353

4 Claims. (Cl. 240—2.1)

The present invention relates to navigation apparatus and more particularly to improved lighting or illuminating means in a magnetic compass and binnacle assembly.

In the past, the compass card for a magnetic compass was made of plastic material with course identifications either impressed therein which were painted a color in contrast to the card or the course markings were directly painted on the card so as to be reasonably legible. When a compass incorporating this type of card was used at night, undesirable white light was emitted into the wheel-house and anyone using the compass readily lost his night vision. As a result, red light was substituted for the white light to enable those working on the bridge of a ship to remain "dark-adapted" and while this was ideal for night use, the light intensity was decreased to a point where reading of the compass became very difficult. That this is a serious disadvantage will be readily appreciated when it is realized that the navigator of a ship must be able to read and pick courses from the compass in a minimum of time, especially in the case of high speed escort vessels, or when it is necessary for the helmsman to steer a zig-zag course.

Accordingly it is an object of the present invention to provide an illumination system in a compass for use in darkness.

Another object is to provide an incorporated indirect lighting system in the binnacle of a compass.

Other objects will more clearly appear from the detailed specification and drawings presented herein in exemplification but not in limitation of the present invention. Like reference characters represent like parts in the accompanying drawings wherein Fig. 1 is a vertical cross-sectional view of a magnetic compass comprising the instant invention, the dotted lines indicating the mounting means for the compass.

Figure 2:
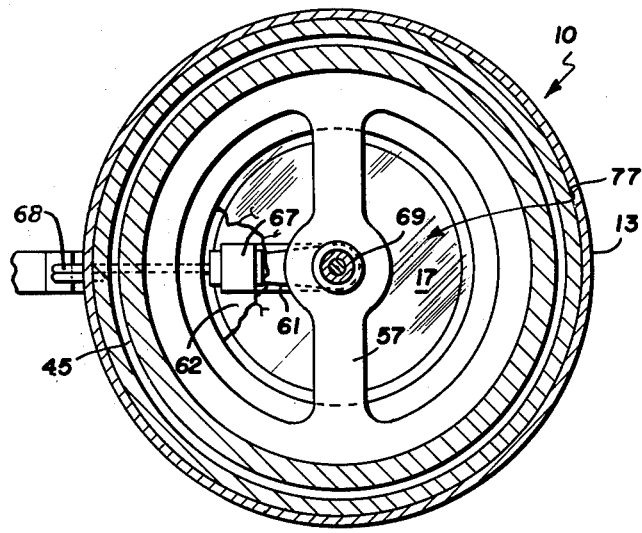

Fig. 2 is a horizontal cross-sectional view taken on lines 2—2 of Fig. 1.

As shown in Fig. 1, the magnetic compass 10 mounted in binnacle 20, comprises a bowl 45 having a bottom cover or casing 13 held thereon by means of a screw thread or bolts. A transparent glass disc 43 is mounted in the upper open portion of the bowl by means of ring 56, upper gasket 42 and lower gasket 15 thus forming a watertight seal. Bowl 45 is provided with a centrally apertured transverse bar or web 57 in which pivot post 69 is centered. Fixed to a depending portion of the bowl 45 is an annular bellows 14 having secured on its bottom end at 18, a glass housing member comprising a pair of rings 58 and 59 affixed to one another by any appropriate means such as screw threads. These mating rings are cut or turned in such manner as to provide faces for supporting a set of gaskets 16 and 19, properly spaced for receiving a second glass disc 17. The bowl 45, bellows 14 and glass discs 17 and 43 form a watertight compartment adapted to contain a compass fluid having low expansion and contraction properties. Positioned above bar 57 is a transparent baffle plate 52 which is sealed to bowl 45 by means of sealing ring 79 and is provided with a central aperture 87. This aperture serves a dual purpose in that it allows for flow of fluid therethrough according to the contracting and expanding action of bellows 14 and it further serves to receive post 69 which is mounted on bar 57 at its lower end, and pivotally supports card assembly 40 at its upper end. The card assembly 40 comprises an opaque card 41 affixed to annular float 46 equipped with card magnets 47 which aid in counteracting any magnetic fields passing through the compass. The use of such magnets is more definitely described in applicants' copending applications, S. N. 319,351 and 319,352 filed November 7, 1952.

A saucer shaped reflecting bowl 62 is secured to the inside of cover 13 by fastening means 63 and affixed in the side of said reflecting bowl is an electrical socket 67 for receiving bulb 61 which is adapted to lie within the central portion of the reflector for reflecting the light in an upward direction to compass card 41. Electrical conductor leads 68 extend from the socket through the cover 13 for connection to the ship service electrical system.

In operation, light from bulb 61 is reflected by reflector 62 through lower glass disc 17 and the transparent fluid thereabove as indicated by dotted lines 11, through apertures or openings 77 provided by bar 57 and the sides of bowl 45, and transparent disc 52 to the upper inner sides 64 of bowl 45 where it is caused to reflect downwardly on card 41 mounted in the uppermost part of the compass. The opaque card 41 prevents light from bulb 61 and reflector 62 from directly reaching disc 43.

Bowl 45 is provided with means such as the annular lip 76 which is arranged to project inwardly so that direct light from light 61 and the reflector bowl 62 will not reach upper glass 43, but will encounter the underside of opaque card 41 and the annular reflecting surface 64 which thereafter directs the rays downwardly, to the upper side of card 41 where the indicia thereon may be discerned in a subdued non-glaring light whose visibility is confined to the working area of card 41.

The effective diameter of lower glass 17 is preferably about equal to that of reflector bowl 62. The diameter of baffle plate 52 is preferably about equal to the greatest transverse distance across opposite apertures 77 in bracket 57 and is preferably less than the diameter of the card.

The diameter of card 41, in its centered position on post 69, with respect to the interior of bowl 45, is arranged so that no light rays from light 61 or from its reflector 62 can reach the underside of upper glass 43. It is directed by the annular reflecting surface 64 downward upon the upper indicia surface of card 41. As shown in Fig. 1 by dotted lines 11, the rays from the outer periphery and from the center of reflector bowl 62 must pass under card 41 to impinge upon annular reflecting surface 64 and are prevented by the outer periphery of card 41 and by the inner periphery of bowl lip 76 from impinging upon the upper glass 43. Annular surface 64 is preferably smooth in finish and white in color.

From the foregoing it will be seen that the present invention has provided a novel and improved means for illumination of a compass card that will have no harmful effect upon the dark adapted eyes of the operator or upon the external visibility of the compass assembly, which is important in operations conducted under cover of darkness.

It should be understood, of course, that the foregoing disclosure relates to only a preferred embodiment of the invention and that it is intended to cover all changes and modifications fo the example of the invention herein chosen for the purposes of the disclosure, which do not constitute departures from the spirit and scope of the invention as set forth in the appended claims, wherein it is claimed:

1. In combination in a compass; an opaque compass bowl; a top transparent viewing face and a bottom transparent plate enclosing within said bowl a sealed chamber for transparent fluid; a casing enclosing said chamber; a transparent baffle plate within said chamber; support means centrally mounted within said chamber adjacent said baffle plate for supporting an opaque compass card assembly; an indicia face on said card assembly positioned adjacent said viewing face; a light source in said casing for emanating light from behind and below said bottom transparent plate; an annular reflecting surface intermediate said indicia face and said viewing face; said support means being constructed to allow the passage of light from said source to said reflecting surface; said reflecting surface being positioned to reflect said light from said source downwardly onto said indicia face.

2. The combination of claim 1 wherein said viewing face covers an aperture in said bowl; said aperture being less in diameter than said annular reflecting surface.

3. The combination of claim 1 wherein said baffle plate and said bottom plate cover are held in apertures which are less in diameter than the greatest diameter of said card.

4. The combination of claim 1 wherein a reflector bowl is positioned within said casing behind said light source.

References Cited in the file of this patent

UNITED STATES PATENTS

| | | |
|---|---|---|
| 1,819,310 | Wilson | Aug. 18, 1931 |
| 2,411,306 | Gaasbeek | Nov. 19, 1946 |
| 2,600,644 | Hand | June 17, 1952 |
| 2,606,277 | Triplett | Aug. 5, 1952 |

FOREIGN PATENTS

| | | |
|---|---|---|
| 129,736 | Great Britain | July 24, 1919 |
| 888,142 | France | Aug. 30, 1943 |